United States Patent [19]
Whatley et al.

[11] Patent Number: 5,997,233
[45] Date of Patent: Dec. 7, 1999

[54] MECHANICAL HAY DISTRIBUTOR

[76] Inventors: Robert T. Whatley; John Scott Sparks, both of P.O. Box 233, Hennepin, Okla. 73444

[21] Appl. No.: 09/247,873

[22] Filed: Feb. 11, 1999

[51] Int. Cl.[6] .................................................. B60P 1/00
[52] U.S. Cl. ........................ 414/25; 414/509; 414/515; 414/518; 414/501
[58] Field of Search .............................. 414/25, 505, 509, 414/510, 515, 513, 521, 514, 518, 503, 504, 516, 523, 501

[56] References Cited

U.S. PATENT DOCUMENTS

| | | | |
|---|---|---|---|
| 862,597 | 8/1907 | Wilson | 414/514 |
| 966,572 | 8/1910 | Miller. | |
| 1,079,211 | 11/1913 | Campbell. | |
| 1,261,997 | 4/1918 | Anderson. | |
| 3,047,174 | 7/1962 | Kasten | 414/503 |
| 3,622,024 | 11/1971 | Grey et al. | 414/509 |
| 3,675,802 | 7/1972 | Best et al. | 414/503 |
| 3,688,919 | 9/1972 | Snider | 414/505 |
| 3,722,722 | 3/1973 | Blair | 414/505 |
| 3,754,388 | 8/1973 | Neely, Jr. | 414/505 |
| 3,884,367 | 5/1975 | Butler et al. | 414/501 |
| 4,008,818 | 2/1977 | Neely, Jr. | 414/505 |
| 4,042,140 | 8/1977 | McFarland. | |
| 4,044,963 | 8/1977 | Hostetler | 414/505 |
| 4,078,677 | 3/1978 | Huggins, Jr. et al. | 414/514 |
| 4,170,426 | 10/1979 | White et al. | 414/518 |
| 4,573,845 | 3/1986 | Carpenter | 414/515 |
| 4,789,289 | 12/1988 | Wilson | 414/505 |
| 5,135,343 | 8/1992 | Wigness | 414/24.5 |
| 5,352,080 | 10/1994 | Bakke | 414/24.5 |
| 5,441,377 | 8/1995 | Cataldie, Jr. | 414/437 |
| 5,470,175 | 11/1995 | Jensen et al. | 414/505 |
| 5,855,466 | 1/1999 | Faulkner et al. | 414/505 |

FOREIGN PATENT DOCUMENTS 154372  7/1932  Switzerland.

*Primary Examiner*—Christopher P. Ellis
*Assistant Examiner*—Isobel A. Parker
*Attorney, Agent, or Firm*—Richard C. Litman

[57] ABSTRACT

A hay distributor is provided that distributes large rectangular hay bales or flakes of hay, operating on a conveyor principle wherein the bales are slowly advanced from the bed of the vehicle to its edge as the vehicle is driven, whereupon by mechanical action the bale is cleaved to flake. A base plate is provided, forming a pivoting point of retrofit attachment of the main frame of the invention to the vehicle bed. The base plate, provides a mounting means for conversion of invention between side or rear-end distribution of hay from the bed of the vehicle. Next, an operating main frame comprises a) rails, having a initial end and a terminal end, along which a hay bale is advanced, and b) incline-adjustable ramps disposed in the path of the rails at their terminal ends, over which the bale advances on its approach to the edge of the bed of the vehicle, which ramps cause natural cleavage of the bale into individual flakes by creating a line of stress. The flakes thus fall off the edge of the vehicle bed, without operator assistance. A skid assembly travels on the rails to drive the bales, and, a remotely-operated motor unit drives the skid assembly. The motor unit may employ a) a winch mounted to the vehicle bed remote from the operating frame and 2) a cable and pulley assembly to transfer drive forces to the skid assembly.

9 Claims, 6 Drawing Sheets

MECHANICAL HAY DISTRIBUTOR

BACKGROUND OF THE INVENTION

1. Field of the Invention

The present invention relates to a mechanical hay distributor. More specifically, the invention is a vehicle-mounted conveyor which mechanically distributes flakes of hay from bales of hay, preferably rectangular bales, thereby allowing an lone user to efficiently distribute hay over large agricultural areas from a moving vehicle.

2. Description of Related Art

Many farmers feed large rectangular bales of hay to their livestock during the winter and fall. Large rectangular bales of hay have many advantages over large round bales of hay for the farmer. For example, storage of large rectangular bales is easier and more efficient than large round bales. A large rectangular bale can be separated and easily broken-up proportionally to a predetermined number of animals in a pasture, while a large round bale can not be broken-up as easily and must be used in whole bale increments, thereby wasting hay. Large rectangular bales are also easier to haul by the load, and, unlike round bales, feasible to be loaded by a lone individual due to reduced size and weight. All these advantages make large rectangular bales more economical for feeding than large round bales.

Even though large rectangular bales have so many advantages, they are far more labor intensive to handle during the feeding distribution process than the large round bales, thus contributing to increased labor cost and expenses, reducing profit margins for the farmer. When distributing the large rectangular bales, the user typically must first load multiple bales on the back of his truck. The user then proceeds to the pasture, stops the truck, gets out of the truck, climbs in the back of the truck, separates some sections or flakes of hay from the bale and throws the hay to the livestock in the pasture. The user then gets back into his truck, drives a little further in the pasture and repeats the process again. When the user has a large pasture of land and a large number of animals to feed, this can be a very slow, very time consuming and tedious process. In the alternative, hands must be hired to expedite the process.

Some farmers have tried other dangerous, alternative methods of distributing hay. Farmers have been known to put their truck in low gear, jump out of the truck, jump in the back of the slow moving truck and throw hay to the livestock while the truck is moving, unmanned. Some farmers have also tried similarly to walk or run on the side of an unmanned truck while it is moving. Some farmers will have one person driving the truck and another riding in the back of the truck throwing off flakes of hay in the pasture while the truck is moving. This not only takes up the time of two men, but is also unsafe since a person is typically unstable while standing in the back of a moving truck.

Several related art patents disclose mechanical hay distributors that distribute round bales of hay. McFarland, U.S. Pat. No. 4,042,140, describes a self-loading trailer which handles and unloads large round bales of hay by means of fork-lift arms, and Wigness, U.S. Pat. No. 5,135,343 describes a handling device comprising of a spearing frame which attaches to the back of a pick-up truck and rolls out a large round bale of hay. At this time, the only way to unload a large rectangular bale of hay is to use a front end loader. Moreover, there is currently no device that will safely and efficiently allow a person to mechanically flake off or unload large bales of hay from the back of a truck.

Other hay distributors for merely dumping hay bales include the patents issued to Miller (U.S. Pat. No. 966,572) and Cataldie, et al. (U.S. Pat. No. 5,441,377, describing a sliding apparatus which pushes a bale of hay over a ramp from a trailer). Hay spreaders for use under a barn roof are described by Campbell in U.S. Pat. No. 1,079,211, by Anderson in U.S. Pat. No. 1,261,997, and in Swiss patent number 154,372. A hay baler and wrapper is seen in U.S. Pat. No. 5,352,080 to Bakke.

None of the above inventions and patents, taken either singly or in combination, is seen to describe the instant invention as claimed.

SUMMARY OF THE INVENTION

Accordingly, it is a principal object of the invention to provide a hay distributor that distributes flakes of hay bales, operable by a single individual while operating a truck or vehicle mounted with the present invention.

The invention is a hay distributor that distributes large rectangular hay bales or flakes of hay, operating on a conveyor principle wherein the bales are slowly advanced from the bed of the vehicle to its edge as the vehicle is driven, whereupon by mechanical action the bale is cleaved to flake. The hay distributor comprises several major and basic components, illustrating several advantages. First, a base plate is provided, forming a pivoting point of retrofit attachment of the main frame of the invention to the vehicle bed. The base plate provides a mounting means for conversion of invention between side or rear-end distribution of hay from the bed of the vehicle. Next, an operating main frame comprises a) rails, having a initial end and a terminal end, along which a hay bale is advanced, and b) incline-adjustable ramps disposed in the path of the rails at their terminal ends, over which the bale advances on its approach to the edge of the bed of the vehicle, which ramps cause natural cleavage of the bale into individual flakes by creating a line of stress. The flakes thus fall off the edge of the vehicle bed, without operator assistance. A skid assembly travels on the rails to drive the bales, and, a remotely-operated motor unit drives the skid assembly. The motor unit may employ a) a winch mounted to the vehicle bed remote from the operating frame and 2) a cable and pulley assembly to transfer drive forces to the skid assembly.

In the preferred embodiment, additional components include an adjustable fence for guiding the hay bale along the rails, thus accommodating a variety of rectangular hay bale sizes. A loading portal is vertically swing-mounted to the terminal end of the operating main frame, providing a gate-like open frame for support of a striking device which assists in the cleavage of the bale and provides consistent flake sizes. The striking device of the preferred embodiment is a motor-driven paddlewheel having rigidly attached flail arms, the paddlewheel horizontally and rotatably mounted on the open frame above the ramps, the frame spaced to permit the flail arms to strike the top surface of a bale as it passes below. As a consequence, the loading portal includes both height-adjustment and width-adjustment mechanisms to permit adjustment of the opening of the frame to correlate with the desired paddlewheel and fence positions.

For secure transportation of hay bales to and from a feeding area, a retaining arm is attached to the terminal end of the main frame. The retaining arm is positioned to be rotated from a storage position below the terminal end of the rails to an up position, which occludes the opening of the frame to prevent hay bales from unintentionally escaping from the load during transportation.

Thus, the hay distributor is adapted to distribute large rectangular bales individually or, in its preferred use, to flake off sections. The hay distributor can be used off the back of a pick-up truck or used on the sides or back of a flat bed truck. In operation, an operator of the vehicle remotely selects an on position for either of both of the winch motor and paddlewheel motor, choosing to run the motors continuously on, or, as a pulse operation to allow selective delivery of the flakes at desired locations. The winch pulls the cable attached to the skid assembly, thus advancing the bale load by sliding them over the rails. A terminal bale in the load approaches the motorized rotating paddlewheel at the top of the frame, which strikes the top of the moving bale and flakes off sections hay from the bale at the cleavage line caused by the ramps. The hay distributor permits a single worker to safely drive a truck and distribute hay at the same time.

It is a further object of the invention to provide a hay distributor that can be used to distribute hay off the back of a pick-up truck or off the sides or back of a flat bed truck.

Another object of the hay distributor is to permit a single worker to safely drive a truck and distribute hay at the same time.

Another object is to provide a hay distributor that is convertible between uses to distribute hay bales whole or in flakes off the back of a truck.

Yet another object is to provide a hay distributor that may be used to deliver hay of the end of a pick-up truck or off the sides or back of a flat bed truck.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
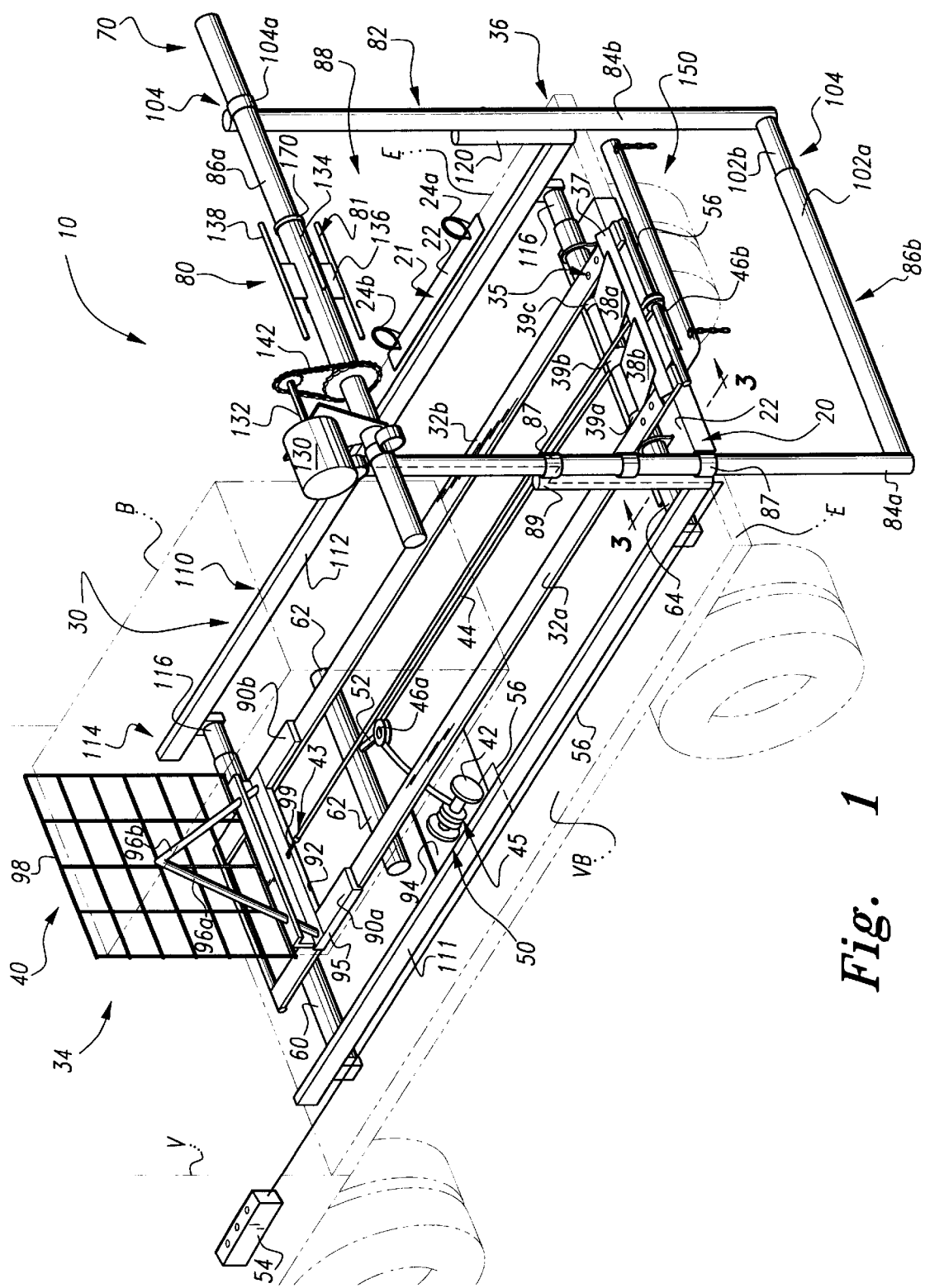
FIG. 1 is an environmental, largely diagrammatic perspective view of a mechanical hay distributor according to the present invention exemplifying its major components.
Figure 3:
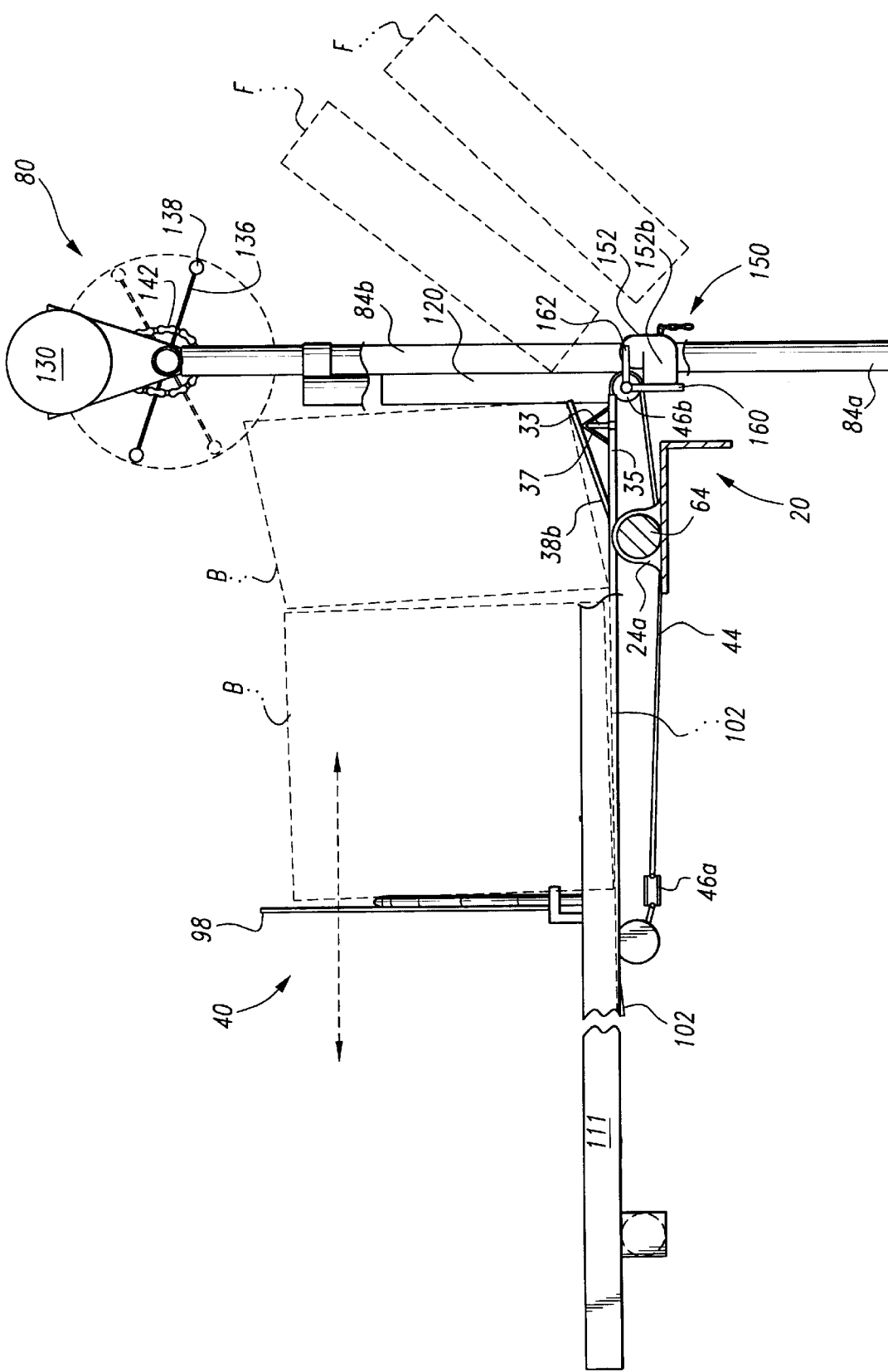
FIG. 3 is a partially-fragmented side view of a mechanical hay distributor according to the present invention, showing a state of operation of the paddlewheel and ramps.

Referring to the FIGS. 1 and 3, the invention is a hay distributor 10 that distributes large rectangular hay bales B or flakes F of hay, operating on a conveyor principle wherein the bales B are slowly advanced from a vehicle bed VB to its edge E as the vehicle V is driven, whereupon by mechanical action the bale B is cleaved to flake.

The hay distributor 10 comprises several major operational components, namely, a base plate 20, a main frame 30 pivotally mounted to the base plate 20, a skid assembly 40 reciprocally disposed on the main frame 30, and a motor unit 50 for driving the skid assembly 40. Additional components which improve operation of the basic invention, later described and included in the preferred embodiment of the invention, include a loading portal 70 swing-mounted to the main frame 30, providing support for a motor-driven paddlewheel 80 which assists in the cleavage of the bale B and provides consistent sizes of flakes F.

The base plate 20 forms a pivoting point of retrofit attachment of the main frame 30 to the vehicle bed VB. In the preferred embodiment, the base plate 20 provides a mounting means for conversion between side or rear-end distribution of hay from the bed VB of the vehicle. As seen in FIG. 1, a first base plate 20 is mounted to the rear edge of the vehicle bed VB, and, a second base plate 21 is shown mounted to a side edge of the vehicle bed VB. Each base plate 20,21 comprises a plate 22, optionally flanged to abut the side of a flatbed as shown in FIG. 1, which is mounted, by welding, bolting or other secure means, to the bed of the vehicle V. Depending upwardly from the plate 22 are two journal collars 24a,24b which permit the main frame 30 to be pivotally mounted thereto from near its terminal end 36 (corresponding to the terminal end 36 of rails 32a,32b). The collars 24a may be offset, as shown in base plate 21, to extend beyond the edge of plate 22, thereby shifting the center of the rotational axis over or beyond the edge of the vehicle bed VB. This permits the entire main frame 30 to be tilted clear of the vehicle bed VB for access to dedicated parts of the bed, such trapdoors to access goose neck trailer receivers and the like.

The main frame 30 comprises rails 32a,32b, having an initial end 34 and a terminal end 36, over which a hay bale B is advanced, the rails 32a,32b tied together by a plurality of support braces, including first brace 60, second brace 62, and a pivot brace 64. The first and second brace 60,62 rest freely upon the vehicle bed VB, and, each brace is attached transversely to the rails 32a,32b. The pivot brace 64 passes through the collars 24a,24b of either base plate 20 or 21, also transversely attached to the rails 32a,32b, thus pivotally connecting the main frame to a base plate.

Figure 4:
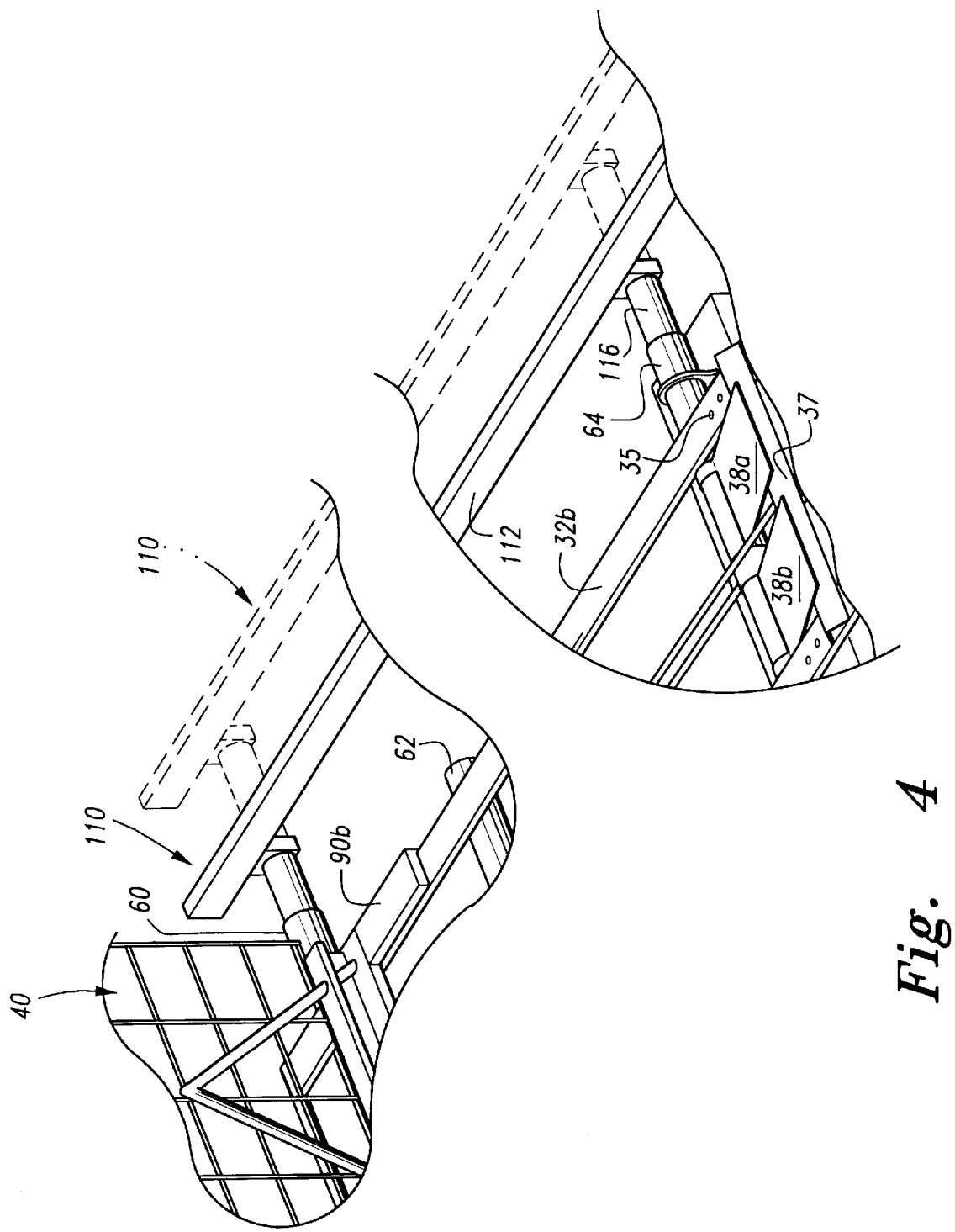
FIG. 4 is a fragmented, detail view of the width-adjustment mechanism of the main operating frame of the mechanical hay distributor.
Figure 5:
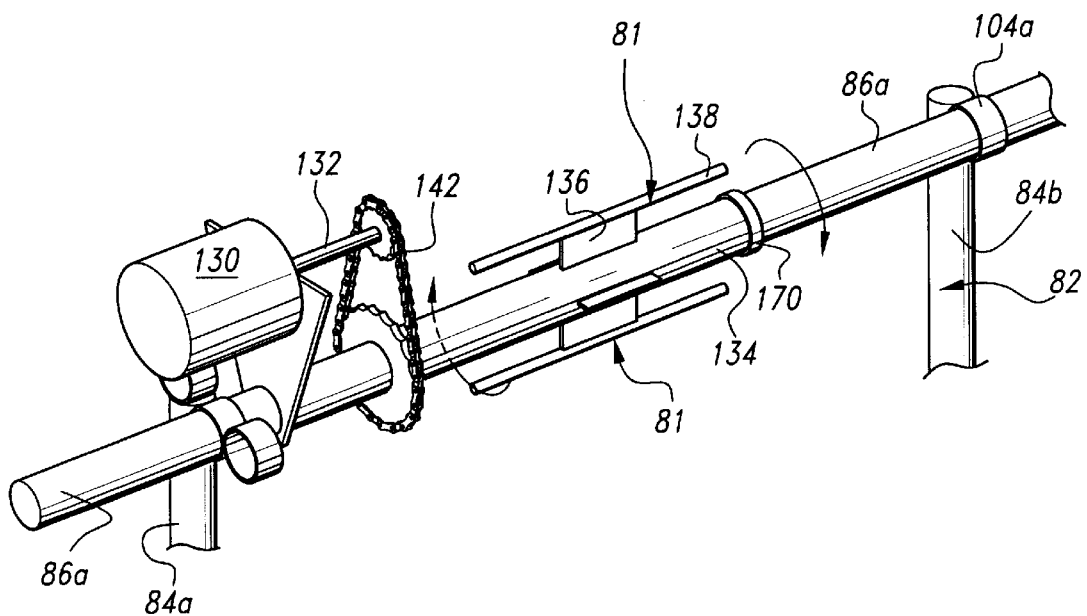
FIG. 5 is a fragmented detail perspective view of the paddlewheel assembly on an upper portion of the loading portal.

Incline-adjustable ramps 38a,38b are disposed in the path of the rails 32a,32b at their terminal ends 36, over which the bale advances on its approach to the edge E. In the preferred embodiment and as more clearly seen in FIGS. 4 and 6, each ramp 38a,38b is rotatably mounted on the pivot brace 64 by means of a plurality of sleeves 39a,39b,39c arranged along the same rotational axis concentric with that of the pivot brace 64. In the preferred embodiment, materials such as a cylindrical steel tube of a first inner and outer diameter (e.g 3 inch o.d.) may be used to manufacture the pivot brace 64, whereas sleeves 39a,39b,39c would each be made of a cylindrical steel tube of second inner and outer diameter (e.g. 3 inch i.d.), the second inner diameter approximating the first outer diameter. Each of ramps 38a,38b are affixed to the sleeves 39a,39b,39c in a coplanar relationship to one another, thus forming an integral unit which causes ramps 38a,38b to rotate in unison and both have the same angle of incline when rotated.

It should be understood that the configuration of the preferred ramp unit is intended to permit the cable 44 to pass between the ramps 38a,38b, to be attached to a central portion of the skid assembly 40; however, in alternative embodiments, the dual ramps may be eliminated by simply rerouting the cable 44, or by using a different drive means to advance the skid assembly 40, such as worm gear drive unit.

Likewise, it should be understood that other embodiments employing a fixed-incline ramp may be developed without departing from the scope of the presently claimed invention. In fact, prototypical development of the preferred embodiment showed that a fixed-incline ramp was effective in causing a stress line to develop in a bale of hay thereby causing it to cleave by its own weight when a sufficient portion of the bale extended over the edge of the ramp. A fixed-incline ramp thus causes natural cleavage of the bale into individual flakes by creating a line of stress at the terminal edge of the ramp. The flakes thus fall off the edge of the vehicle bed, without operator assistance.

However, to fine tune the size and consistency of each flake of hay so cleaved, the improvement of incline-adjustable ramps was devised, in conjunction with the paddlewheel 80, described in more detail later. Such improvements are significant to the use of various hay types, such as alfalfa hay or grass hay, which when baled, result in significantly differing compacting densities. For example, alfalfa hay bales often have higher density of packing, and thus are more difficult to cleave, thus making the preferred embodiment desirable.

Figure 6:
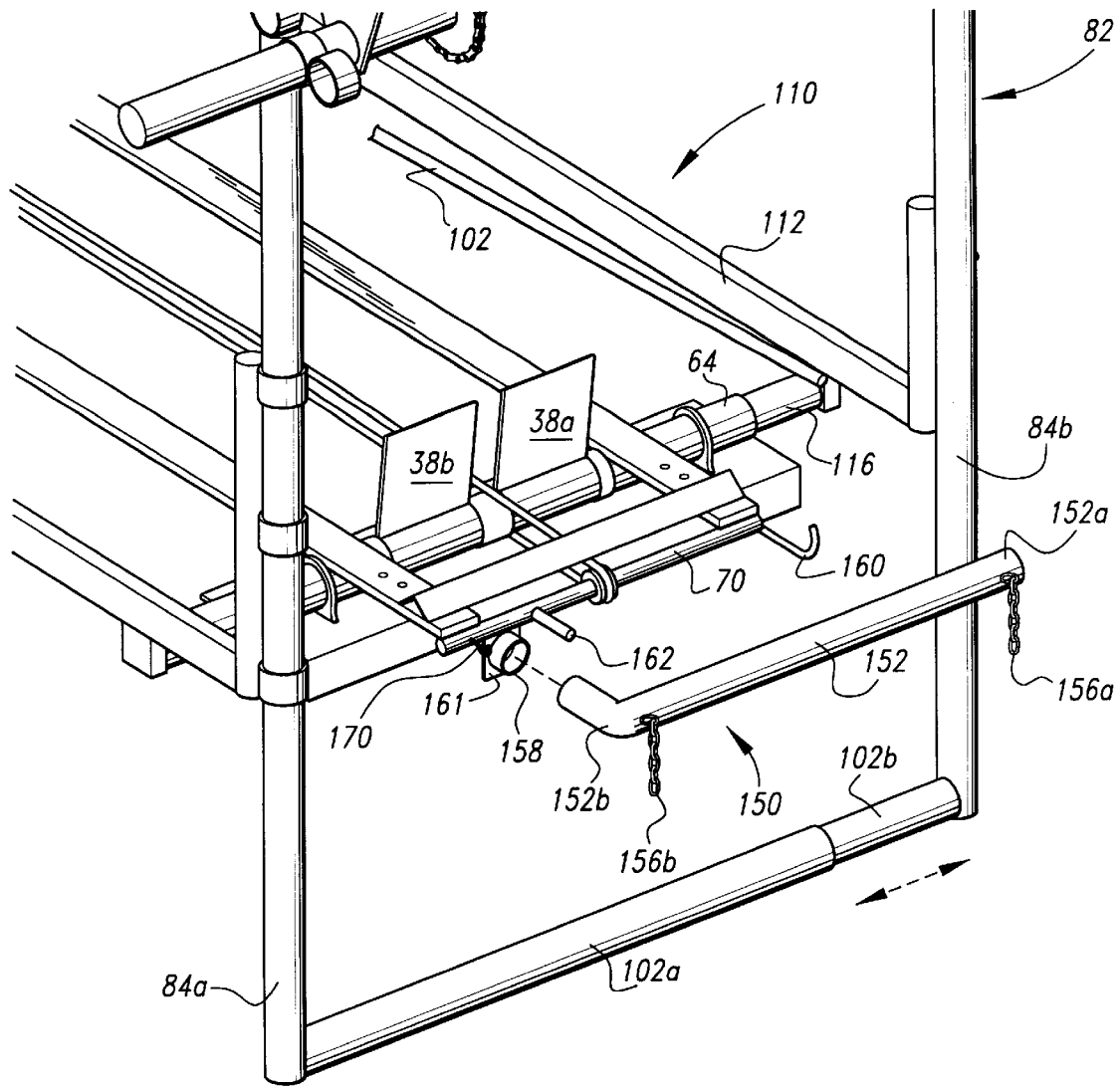
FIG. 6 is a fragmented detail perspective view of the lower portion of loading portal and the adjustable ramps of the main operating frame.

The angle of incline of the ramps 38a,38b is determined by means of an removable bar 37 on which the ramps 38a,38b rest. As more clearly seen in FIGS. 3 and 6, the bar 37 of the preferred embodiment may be a simple angle iron, removably attached to each rail 32a,32b by means of a simple hole and dowel arrangement. For each such arrangement, the bar 37 includes a dowel 33 bisecting the interior angle of the angle iron. Each rail 32a,32b defines a series of spaced holes 35 uniformly sized to closely receive dowel 33, the holes positioned between the terminal end 36 and the pivot brace 64. Any predetermined number of dowels 33 attached to bar 37 should of course be aligned to be received by a like number of corresponding holes 35, each dowel 33 being of sufficient length and diameter to firmly seat within a corresponding hole 35. Thus, to change the incline of ramps 38a,38b, the ramps may be rotated upwardly (as shown in FIG. 6) and the bar 37 advanced or retreated along the rails 32a,32b and set in place, and the ramps lowered to rest on the bar 37. Preferably, adjustable ramps 38a,38b have five settings of varying gradients which assist in the flaking of the bale 30, provided by a series of five holes 35.

Figure 2:
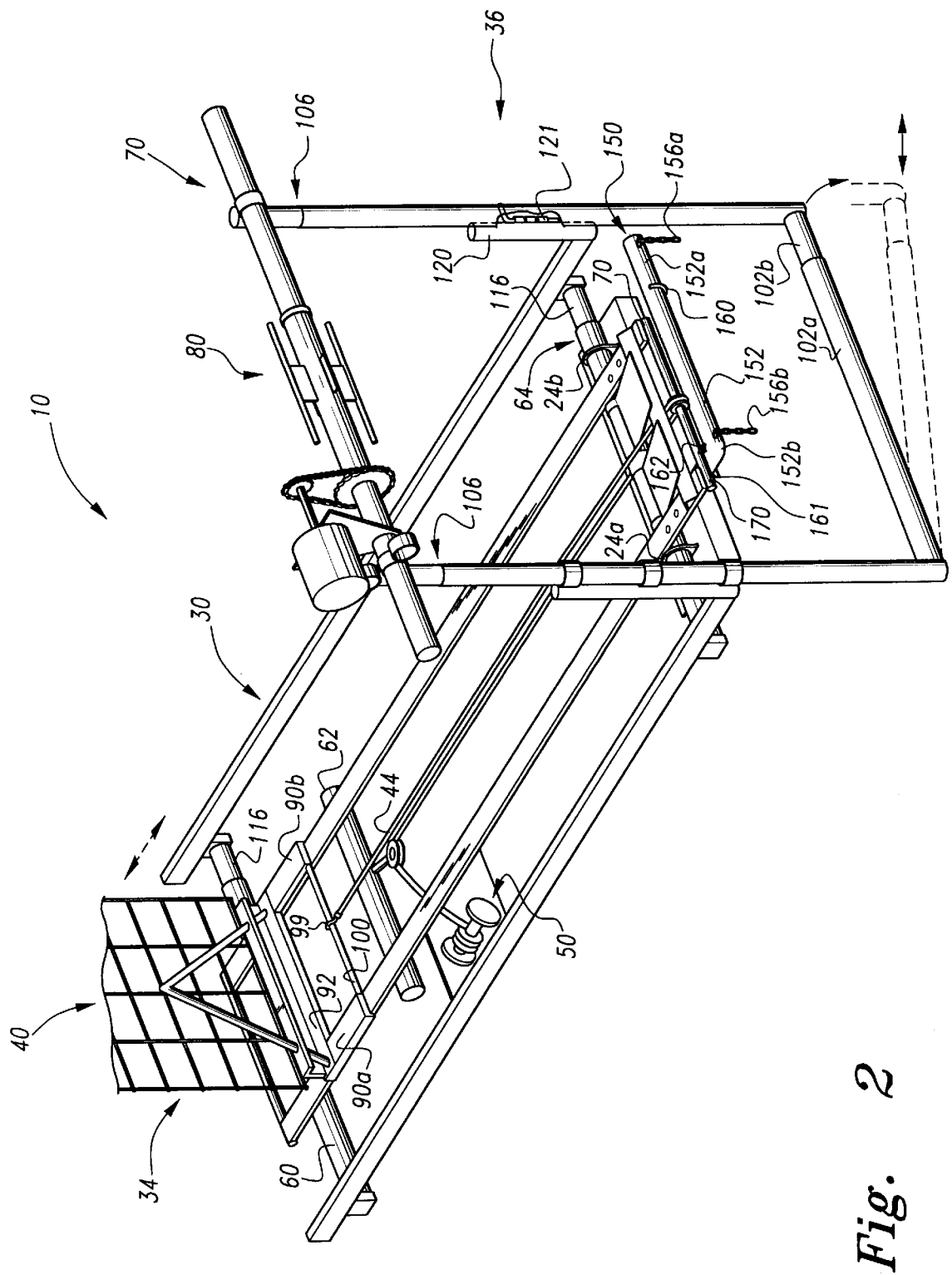
FIG. 2 is a perspective, partially fragmented view of a mechanical hay distributor according to the present invention, showing the swinging frame in a partially opened position in partial, phantom-line view.

The skid assembly 40 travels from the initial end 34 on the rails 32a,32b toward the ramps 38a,38b driving the bales B, and, a remotely-operated motor unit 50 drives the skid assembly 40. The motor unit 50 may comprise a electric winch 42, diagrammatically illustrated in FIGS. 1 and 2, mounted anywhere to the vehicle bed VB or other remote position from the operating main frame 30. The winch 42 may include a mounting plate 94 for attachment to the vehicle bed VB. The winch 42 may be mounted above or below the vehicle bed VB, as desired, and is shown near the main frame 30 for illustrative convenience. The electric winch 42 includes a remote control unit 54, including conventional circuitry, switches and wiring 56, to permit a remote user to operate the winch from the cab of the vehicle. The control unit 54 may include selective switch positions, including a continuously-on mode, a reverse mode, or, a pulse mode which allows the user to intermittently activate the winch 42. The operator may choose to activate the winch 42 for only a short duration and only when the vehicle is being operated in a hay delivery area, activated by a simple on-off switch.

When such a motor unit 40 is used, a cable and pulley arrangement accompanies the winch 42, wherein the cable 44 is attached at a first end 43 to the skid assembly 40 and at a second end 45 to the winch 42. The plurality of pulleys 46a,46b are suitably arranged to transfer drive forces to the skid assembly 40 by means of the cable 44 such that the skid assembly 40 is moved from the initial end 34 to the terminal end 36 during operation.

In the preferred embodiment, a return pulley 46b and a slave pulley 46a are shown attached by suitable means to the main frame 30. The slave pulley 46a may be attached to second brace 62 by a snap shackle (diagrammatically represented at 52), and, positioned to direct the cable to the winch 42. The return pulley 46b is mounted on a pulley shaft 56 which is transversely affixed to the rails 32a,32b at their terminal ends 36. Thus, the cable 44 winds from winch 42 through the slave pulley 46a, passing between and generally parallel to rails 32a,32b, below pivot brace 64 to return pulley 46b. At this point, the cable 44 is reversed in direction by return pulley 46b, the cable 44 passing between rails 32a,32b above pivot brace 64 and between ramps 38a,38b to terminate at its first end 43, where it is attached to skid assembly 40.

The skid assembly 40 comprises two skid plates 90a,90b, each skid plate 90a,90b including a lateral flange 95 to lip over the outside edges of rails 32a,32b, for guiding skid plates 90a,90b together over rails 32a,32b. The skid plates 90a,90b are attached to one another by a support beam 92 which spaces apart the skid plates 90a,90b by a predetermined distance to position each skid plate over rails 32a,32b with flange 95 lipping its associated rail. A cable attachment rod 100 is also provided transversely spanning the skid plates 90a,90b. The first end 43 of cable 44 is attached centrally to rod 100. A hook 99 may be attached to first: end 43 for removable attachment of the cable 44 to rod 100.

Two upright bars 96a,96b depend perpendicularly from the support beam 92 to provide a back rest against which a bale of hay rests. The upright bars 96a,96b are advanced toward the terminal end 36 of the main frame as the cable 44 is winched; thus, after loading, the bars 96a,96b push the entire load of bales B ahead of the bars 96a,96b as all or a portion of a single bale B rests on top of the skid plates 90a,90b. The remaining bales B in the load rest directly on rails 32a,32b. An added brace 98 may be attached coplanar to the bars 96a,96b to form an open wall to prevent a bale B from rearwardly falling off the skid assembly 40.

Because bales of hay come in various rectilinear shapes, an adjustable fence 110 is provided for guiding a load of hay bales E along the rails 32a,32b. In the preferred embodiment, a first fence 111 is affixed to first brace 60 and pivot brace 64 at a first end, these braces characterizing the braces proximate the initial end 34 and terminal end 36. A second fence 112 is provided parallel to the first fence 111, adjustably attached to the first brace 60 and pivot brace 64 at an opposing end. The adjustment mechanism 114 may be a telescoping arrangement of tubes, the pivot brace 64 and first brace 60 each preferably being a tube having a predetermined inner diameter. A mating cylinder 116, having an outer diameter sized to be closely received by the corresponding pivot brace 64 or first brace 60, is attached to the second fence 112 and positioned to be telescopingly received by a corresponding one of the first or pivot braces 60,64. Thus, the entire second fence 112 can be spaced apart from the first fence 111 by a desired distance to correspond with a dimension of the bale B.

To assist in the advancement of the bales B resting on the rails 32a,32b towards ramps 38a,38b, an incline rod 102 (FIG. 6) proximate each fence 111,112 is provided. The rod 102 is affixed at an incline to suitable points of the main frame 30, such as pivot brace 64 or the fence 111,112 itself (FIG. 3). Thus as a bale B advances from the initial end 34 towards the terminal end 36, the rods 102 support the edges of the bale B until it reaches the ramps 38a,38b.

To assist in the cleavage of bales of hay, a loading portal 70 is vertically swing-mounted to the terminal end 36 of the operating main frame 30, providing a gate-like open frame for support of a striking device. The striking device of the preferred embodiment is a motor-driven paddlewheel 80 having rigidly attached flail arms 81. The paddlewheel 80 is horizontally and rotatably mounted on a rectangular and centrally open frame 82.

In the preferred embodiment, the open frame 82 includes a first upright member 84a and a second upright member 84b, and, an upper transverse member 86a and a second transverse member 86b. The upright and transverse members 84a,84b,86a,86b form a rectangle, thereby defining the open frame 82 and a central opening 88 of sufficient diameter to permit passage of a bale of hay or flakes cleaved therefrom. As a consequence of the variously sized hay bales available commercially, the open frame 82 includes both height-adjustment and width-adjustment mechanisms to permit adjustment of the opening 88 of the frame 82 to correlate with the desired paddlewheel 80 and fence 110 positions.

Thus, the first upright member 84a is pivotally mounted to a hinge post 89 depending vertically from the terminal end 36 of the main frame 30, specifically from the first fence 111. The pivot means for pivotally mounting the upright member 84a to the hinge post 89 may be a plurality of collars 87 manufactured of steel cylindrical tubing coaxially affixed, as by welding, to the hinge post 89. The upright member 84a, also being manufactured of steel cylindrical tubing of an outer diameter matching the inner diameter of the collar 87, closely passes through each collar 87. The upright member 84a may be then fixed at the desired height in its pivotal position by a collar, pin or other means (not shown) in a conventional manner. As suggested by FIG. 2, the open frame 82 is swing-mounted to the hinge post 89 to permit movement from an open position (shown in solid lines) to a closed position (partially shown, for illustrative clarity, in phantom lines).

To secure the loading portal to the second upright member 84 in a closed position, as second post 120 depends perpendicularly upward from the second fence 112 of the adjustable fence 110, at the terminal end 36 of the main frame 30. A bolt-action gate lock 120, as known in the art, is affixed to a second post 120, the lock 120 having cooperating and separable parts. The mating parts are affixed and aligned on the second upright member 84b and the second post 120 in any conventionally suitable manner, such as welding.

Each of the transverse members 86a,86b depend perpendicularly from the first upright member 84a at opposing ends, and include a width-adjustment mechanism 104. In the preferred embodiment as shown, the width-adjustment mechanisms 104 of the upper and lower transverse members 86a,86b differ in structure; however, it should be understood by one of ordinary skill in the art that any width-adjustment means adaptable to the purposes of the present invention may be used. For lower transverse member 86b, telescoping components 102a and 102b to define the width-adjustment mechanism 104. The telescoping components 102a and 102b may be manufactured of steel cylindrical tubing of an outer diameter matching the inner diameter of the other. As shown, a first telescoping component 102a is affixed perpendicularly to the first upright member 84a, and, the second telescoping component 102b telescopes therefrom. To complete the open frame 82, the second upright member 84b is attached to span between the upper and lower transverse members. However, the width-adjustment mechanism 104 of the upper transverse member 86a comprises a sliding collar 104 attached to the second upright 84b, which collar 104 is mounted to travel reciprocally along the upper transverse member 86a. Therefore, a predetermined length of the upper transverse member 86a determines the maximum travel of sliding collar 104 and the maximum usable diameter of opening 88.

Similarly, a height-adjustment mechanism 106 for the upright members 84a,84b may be provided. Telescoping parts 108a,108b may be used for each of the first and second upright members 84a,84b, with appropriate height-fixing means to temporarily secure upright members 84a,84b at the desired height, such as a pin, channel-lock, or other means (not shown) as known in the prior art.

The open frame 82 thus provides a support structure for the mounting of the paddlewheel 80, which is horizontally and rotatably mounted on a upper transverse member 86a. In the preferred embodiment an electrically operable drive motor 130, having a drive shaft and sprocket unit 132, is affixed to the upper transverse member 86a, the unit 132 shown coaxially oriented with the transverse member 86a. Electrical circuitry and wiring 56 is operably tied to the remote control unit 54, including conventional circuitry, switches and wiring, to permit a remote user to activate the drive motor 130 from the cab of the vehicle. The control unit 54 may include selective switch positions, including a continuously-on mode, or, a pulse mode which allows the user to intermittently rotate the drive shaft and sprocket unit 132 of motor 130.

The paddlewheel 80 comprises a tubular sleeve 134, having a inner diameter approximating the outer diameter of the upper transverse member 86a, and rotatably slipped thereon. A retaining collar 170 prevents lateral movement of the sleeve 134 in a direction away from motor 130. The plurality of flail arms 81 are affixed to the tubular sleeve 134, and, comprise a support arm 136 depending diametrically outward from the tubular sleeve 134. Attached to each support arm 136 are paddle rods 138, which are attached coaxial with each of the ramps 38a,38b, the upper transverse member 86a, and the drive shaft and sprocket unit 132 of the drive motor 130. A drive sprocket 140 is transversely attached to the tubular sleeve 134, and operably tied to the drive shaft and sprocket unit 132 by means of a drive chain 142.

In operation, the paddle rods 138 are rotated through a cylindrical path by means of the described linkages between drive motor 130 and the tubular sleeve 134, so that the rods 138 strike the top surface of bale B along a line approximately coplanar with the stress line caused by the ramps 38a,38b. The impact with the bale B thus accelerates flaking along the stress line of the bale B caused by the ramps 38a,38b.

For secure transportation of hay bales to and from a feeding area, a swing-mounted retaining arm 150 is attached to the terminal end 36 of the main frame 30. The retaining arm 150 is positioned to be rotated from a storage position below the terminal end 36 of the rails 32a,32b to an up position, which occludes the opening 88 of the open frame 82 to prevent hay bales from unintentionally escaping from the load during transportation. As seen in FIG. 6, the retaining arm 105 comprises an L-shaped tube 152 having a free end 152a and an elbow end 152b. Each of a pair of safety chains 156a,156b is attached proximate a different one of the free end 152a and the elbow end 152b. The free end 152a rests upon a first support bracket 160 depending from the terminal end 36, specifically from the pulley shaft 70.

At the elbow end 152b, the L-tube 152 is telescopically attached to a cylindrical stud 158, which in turn protrudes perpendicularly from a plate 160, in turn depending downward front the pulley shaft 56. The L-tube 152 thus is permitted to be reciprocally moved inward and outward (towards and away from the initial end 34, respectively), from the storage position to a swingable mode which permits the free end 156a to clear the terminal end 36 in its path of rotation. More specifically, the pulley shaft 70 of the terminal end 36 has a second support bracket 162 depending from the pulley shaft 70 at between the first support bracket 20 and the plate 160, near plate 160. This second support bracket 162 must be cleared by the L-tube 152 during its rotation; however, upon moving the L-tube 152 inwardly after clearing the second support bracket 152, the L-tube 152 can be rested against the second support bracket 152, maintaining an upright orientation of the retaining arm 150 and occluding the opening 88. The safety chain 156b may then be latched onto a hook 170, also depending from the pulley shaft 70, to prevent inadvertent dislodging of the L-tube 152 from its upright position.

Moreover, such upright orientation of the retaining arm 150 not only permits the hay bales B from falling from the load during transportation, but also allows the skid assembly 40 to be secured to the main frame 30 when no load is carried. During no-load operation of the vehicle, the skid assembly 40 is positioned at its maximum travel distance towards the terminal end 36, where the safety chain 156 of the free end 152a can be attached to a part of the skid assembly 40, such as the one of the upright bars 96a,96b.

Thus, the hay distributor is adapted to distribute large rectangular bales individually or, in its preferred use, to flake off sections. The hay distributor can be used off the back of a pick-up truck or used on the sides or back of a flat bed truck. In operation, an operator of the vehicle remotely selects an on position for either of both of the winch motor and paddlewheel motor, choosing to run the motors continuously on, or, as a pulse operation to allow selective delivery of the flakes at desired locations. The winch pulls the cable attached to the skid assembly, thus advancing the bale load by sliding them over the rails. A terminal bale in the load approaches the motorized rotating paddlewheel at the top of the frame, which strikes the top of the moving bale and flakes off sections hay from the bale at the cleavage line caused by the ramps. The hay distributor permits a single worker to safely drive a truck and distribute hay at the same time.

The overall dimensions of the hay distributor 10 are typically eight feet long and three feet to four and a half feet wide. Other preferred dimensions follow. Each rail 32a,32b is four inches wide and is secured parallel to the other. The braces 60,62,64 are preferably two inch diameter iron tubing. Each skid plate 90a,90b is 4"×4" when viewed in plan view. A 1"×4" angle iron forms the support beam 92, which is joined with a ⅞" iron rod formed into a triangle-shaped backing to define the upright bars 96a,96b. The winch mounting plate 94 may be two inch angle iron and the base plate 70 is 2"×6" angle iron.

It is to be understood that the present invention is not limited to the embodiment described above, but encompasses any and all embodiments within the scope of the following claims.

I claim:

1. A hay distributor comprising:
    a base plate adapted to be mounted to a vehicle bed said base plate including a plate adapted for attachment to an edge of a load bed of a vehicle, said base plate including a plurality of journal collars;
    a main frame pivotally mounted to said base plate through said journal collars, said main frame having an initial end and a terminal end, said main frame further comprising:
        a first rail and a second rail, each said rail extending from said initial end to said terminal end, said second rail being spaced apart from said first rail and generally parallel to said first rail, said first rail and said second rail being joined by a plurality of support braces, said support braces including a pivot brace transversely attached to said first rail and said second rail at said terminal end of said main frame, said pivot brace passing through said journal collars of said base plate;
        a ramp transversely disposed in the path of said first rail and said second rail and affixed proximate said terminal end, said pivot brace including a sleeve rotatable attached to said pivot brace and to said ramp for altering the incline angle of said ramp; and
        a removable bar disposed beneath said ramp and supported by said first rail and said second rail;
        a skid assembly for guiding a bale along said first rail and said second rail from said initial end to said terminal end of said main frame; and
        a motor unit for advancing said skid assembly towards said terminal end of said main frame.

2. The hay distributor according to claim 1, wherein the skid assembly comprises two skid plates, each said skid plate including a lateral flange lipping over each said first rail and said second rail, and an upright member for securing the bale during advancement of said skid assembly.

3. The hay distributor according to claim 1, wherein said motor unit includes a winch, a cable attached to said winch and said skid assembly, and a plurality of pulleys arranged to pull said skid assembly from said initial end to said terminal end.

4. The hay distributor according to claim 1, further comprising a loading portal having an
    open frame depending upwardly from said main frame for supporting a motor-driven paddlewheel over said first rail and said second rail and permitting passage of a bale;
    a paddlewheel rotatably mounted on a said open frame; and
    a drive motor for rotating said paddlewheel.

5. The hay distributor according to claim 4, further comprising a remote control unit for operating said drive motor.

6. The hay distributor according to claim 1, further comprising a remote control unit for operating said motor unit for advancing said skid assembly.

7. A hay distributor comprising:
    a base plate adapted to be mounted to a vehicle bed;
    a main frame mounted to said base plate, said main frame having an initial end and a terminal end, said main frame further comprising:

a rail extending from said initial end to said terminal end; and a ramp transversely disposed in the path of said rail and affixed proximate said terminal end;

a skid assembly for guiding a bale along said rail from said initial end to said terminal end of said main frame; and a motor unit for advancing said skid assembly towards said terminal end of said main frame;

a fence spaced from said rail for guiding the bale along said rail;

a width-adjustment mechanism for changing the spacing of said fence from said rail; and a loading portal including:
  an open frame depending upwardly from said main frame, said open frame having an opening permitting passage of the bale, said open frame having a width-adjustment mechanism for changing the diameter of said opening to correlate with a position of said fence;
  a motor-driven paddlewheel rotatable mounted on said open frame above said rail; and
  a drive motor for rotating said paddlewheel; wherein said main frame further comprises a hinge post depending upwardly from said fence, and
  said open frame is swing-mounted to said hinge post to permit movement from an open position to a closed position.

8. The hay distributor according to claim 7, further comprising a retaining arm swing-mounted to said main frame for occluding said opening of said loading portal when in a closed position.

9. The hay distributor according to claim 7, wherein said open frame includes an upright member attached to said main frame,
  an upper transverse member attached perpendicularly to said upright member, and
  wherein said paddlewheel comprises a sleeve rotatably attached to said upper transverse member, a support arm depending radially from said sleeve, and a paddle rod transversely attached to said support arm to align coaxially with both said ramp and said upper transverse member.

\* \* \* \* \*